April 11, 1967

W. BUSCHBECK 3,314,025

HYBRID BRIDGE FOR APPLYING TWO MUTUALLY ISOLATED SOURCES TO A COMMON LOAD, INCLUDING MEANS TO PARTIALLY SHIFT BALANCING RESISTORS AND LOAD RESISTANCES TOWARD BRIDGE CENTER

Filed March 16, 1964

3 Sheets-Sheet 1

INVENTOR

Werner Buschbeck

BY Spencer & Kaye

ATTORNEYS

April 11, 1967 W. BUSCHBECK 3,314,025
HYBRID BRIDGE FOR APPLYING TWO MUTUALLY ISOLATED SOURCES
TO A COMMON LOAD, INCLUDING MEANS TO PARTIALLY SHIFT
BALANCING RESISTORS AND LOAD RESISTANCES
TOWARD BRIDGE CENTER
Filed March 16, 1964 3 Sheets-Sheet 2

INVENTOR
Werner Buschbeck
BY Spencer & Kaye
ATTORNEYS

INVENTOR
Werner Buschbeck
BY Spencer & Kaye
ATTORNEYS

United States Patent Office 3,314,025
Patented Apr. 11, 1967

3,314,025

HYBRID BRIDGE FOR APPLYING TWO MUTUALLY ISOLATED SOURCES TO A COMMON LOAD, INCLUDING MEANS TO PARTIALLY SHIFT BALANCING RESISTORS AND LOAD RESISTANCES TOWARD BRIDGE CENTER

Werner Buschbeck, Ulm (Danube), Germany, assignor to Telefunken Patentverwertungsgesellschaft m.b.H., Ulm (Danube), Germany Filed Mar. 16, 1964, Ser. No. 352,109
31 Claims. (Cl. 333—11)

The present invention relates to a circuit arrangement, and, more particularly, to a circuit arrangement by means of which a common load is fed by two high-frequency current sources which themselves have the same frequency and whose phases are applied to the inputs of the circuit at substantially the same or opposite phase. The circuit incorporates a balanced alternating current bridge for decoupling the two high-frequency sources from each other.

In practice, it is generally desired that the decoupling effect of the bridge be maintained, over as large a frequency range as possible, with reference to the terminals of the high-frequency source, which are dependent on the balanced state of the bridge. In addition to the requirement that the balance of the bridge, and hence the decoupling based on the balancing, be maintaind, what is also required is that, substantially independently of frequency, the currentlessness of the load balancing resistance be maintained throughout normal operation, substantially independently of frequency, whenever the frequency is changed, and that, as a result, the sum of the total power output of the two high-frequency sources be applied to the common load. Yet another requirement of such a circuit is that the input matching be maintained at the inputs of the circuit.

It is, therefore, the primary object of the present invention to provide a circuit arrangement which meets the above requirements.

It is another object of the present invention to provide a bridge circuit meeting the above requirements, in which the magnitude of the resulting load resistance is, selectively, half or double the value of the input resistance.

With the above objects in view, the present invention resides, basically, in a circuit arrangement for feeding a common load from first and second high-frequency generators whose outputs are of the same frequency and are either in phase or of the opposite phase, the circuit arrangement comprising a balanced Wheatstone-type alternating current bridge having a center point, which is preferably grounded, and two diagonals, the two generators being connected across the diagonals, respectively. Two opposite arms of the bridge are load arms and the other two opposite arms are balancing arms. The load arms are connected to, respectively, first and second coaxial line sections each having an external and an internal conductor, and each conductor has an inner and outer end. The external conductor of each coaxial line section constitutes an inductance, and the inductances of the two load arms are equal to each other. The outer end of each external conductor is connected to one point of the bridge pertaining to the respective load arm and the outer end of the corresponding internal conductor is connected to a place in the respective load arm which is spaced from this one point, i.e., the outer end of the internal conductor is connected to the other point of the respective load arm or an intermediate point, such as the electrical mid-point. The inner ends of the external conductors are connected to each other in consequence of which the inductances are connected in series across one of the diagonals of the bridge, the junction of the external conductors being connected to, or constituting, the center point of the bridge. A resistance element is connected across the inner ends of the external and internal conductors of each of the coaxial line sections, this resistance element representing at least a portion of the load which is thus shifted toward the center point of the bridge.

Additional objects and advantages of the present invention will become apparent upon consideration of the following description when taken in conjunction with the accompanying drawings in which.

Figures 1, 2, 3, 4:
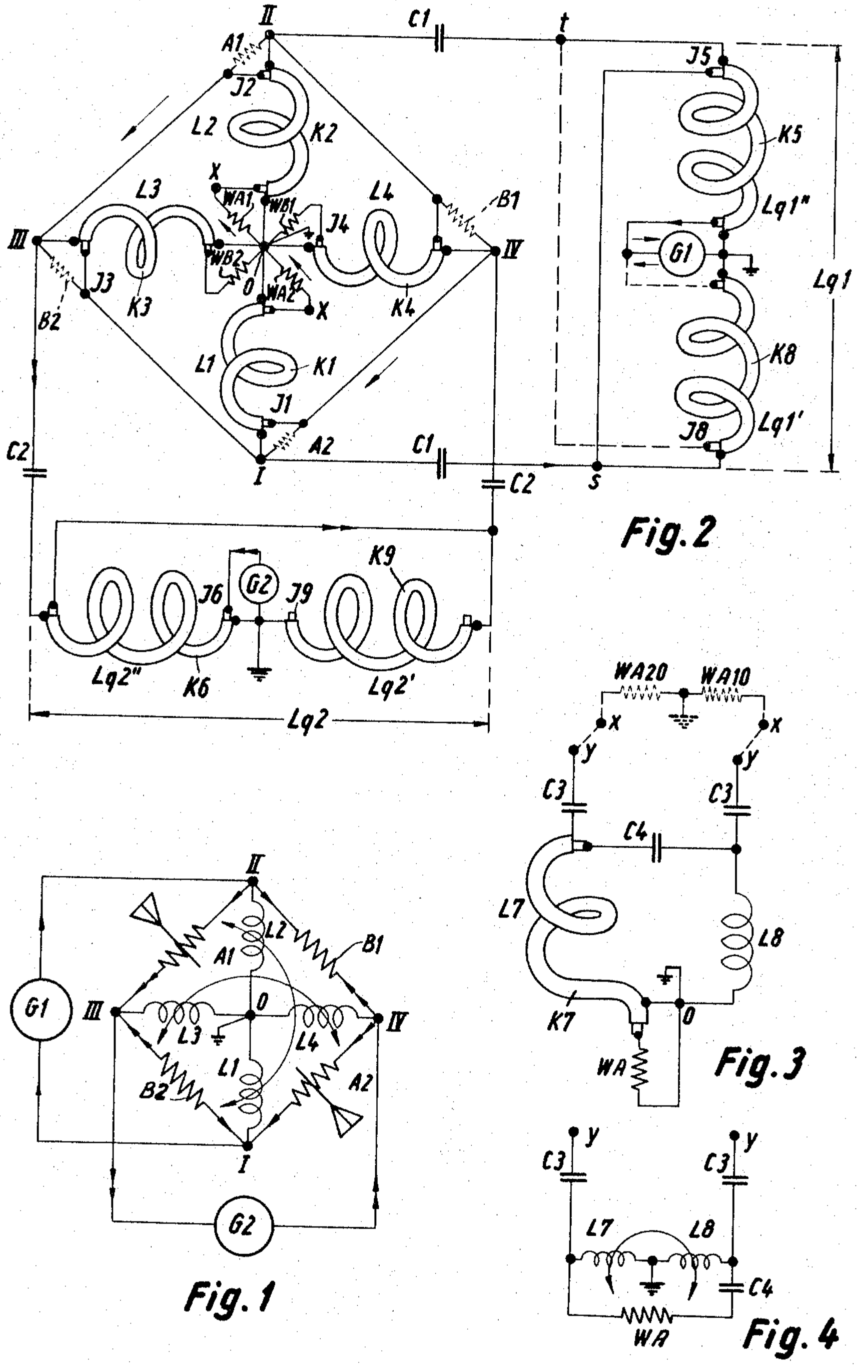
FIGURE 1 is a circuit diagram of a balanced Wheatstone bridge showing the principle underlying the present invention.
FIGURE 2 is a circuit diagram of a bridge circuit according to the present invention and also shows the connection of the two high-frequency generators across the two bridge diagonals.
FIGURE 3 is a circuit diagram of an output element for use with a non-symmetrical resistance.
FIGURE 4 is an equivalent circuit diagram of the circuit of FIGURE 3.

Referring now to the drawings, FIGURE 1 is a circuit diagram of a bridge for parallely connecting two A.C. sources, the bridge being based on the principle of the Wheatstone bridge, there being inductances across the two bridge diagonals. The sources are constituted by two high-frequency generators G1 and G2; in practice, these generators may be high-frequency transmitters or high-frequency generators for producing high frequencies for industrial purposes. The corner points of the bridge are indicated at I, II, III and IV. The two generators G1 and G2 are connected across the diagonals I, II, and III, IV, respectively, to be in phase with respect to points I and III and of opposite phase with respect to points I and IV. The direction of the instantaneous currents is represented by the arrows, the currents due to generator G1 being identified by one arrow head and the currents due to generator G2 by two arrow heads.

For purposes of explanation, let it be assumed, for the time being, that the inductances L1, L2, L3, L4, connected between the center point O and points I, II,, III and IV, respectively, are not present. Two load resistors A1 and A2 are incorporated in the opposite bridge arms II, III, and I, IV, these load resistances being represented symbolically by antennas, so that the resistances B1 and B2 are incorporated in the other two opposite bridge arms II, IV, and I, III. It is assumed that the balancing resistances and the load resistances are equal to each other and to a value R, which value is also equal to the input resistance across the diagonals of the bridge. As is readily apparent from the direction of the instantaneous currents, shown by the arrows, the instantaneous currents produced by the two generators are added to each other as they flow through the two bridge arms incorporating the load resistances and cancel each other as they flow through the two bridge arms incorporating the balacing resistances. A consideration of the composition of the instantaneous currents shows that the generator voltages have to be of the same phase at opposite ends of each balancing resistance but of opposite phase with respect to each other. Here it should be pointed out that, as is well known, a bridge can be balanced even if the bridge arms are non-symmetrical, so that it is not absolutely essential that the load resistances be equal to the balancing resistances.

It will be seen from the above that, during normal operation, the sum of the two outputs of the generators G1 and G2 is applied to the two load resistances A1 and A2, while no current flows through the two balancing resistances B1 and B2. Since the two generators are decoupled from each other due to the balancing of the bridge, the breakdown or failure of one of the two generators will not disturb the operation of the other generator. Let it be assumed that the current produced by generator G2 is zero, which would be represented, in FIGURE 1, by the elimination of the currents represented by the double arrow heads: the output of generator G1 would then be distributed evenly among the four bridge arms so that each of the two load resistances would then stilll receive half of the output of generator G1. This is how conventional circuits of this type operate.

The serial connection of inductances L1, L2 and L3, L4, across the bridge diagonals will not have any effect in the balance of the bridge. Consequently, the decoupling between the two generators G1 and G2, which is independent of frequency, is preserved even if these inductances are present. Furthermore, the distribution of the output of the two generators among the individual bridge resistances and the phase of the currents through the resistances will not be changed by the inductances in the bridge diagonals, so that the requirement of frequency-independent currentlessness of the balancing resistances is still preserved. These inductances do, however, change the input resistance appearing across the bridge inputs I, II and III, IV, because these inductances are connected in parallel with the original input resistances. Thus, an inductive reactance current will flow through the parallel connections formed by these inductances, this reactance current being in addition to the active (i.e., wattage producing) current flowing through the ohmic bridge resistances. As will be shown later, this can easily be compensated for, in a frequency-independent manner, by providing additional reactive components of suitable values.

The inductances are mutually coupled to each other in pairs, i.e., the inductances L1 and L2 are coupled to each other and the inductances L3 and L4 are coupled to each other, as represented, in FIGURE 1, by the two double arrows. This is readily possible in view of the fact that the currents flowing through the coupled inductances are of the same phase, and this coupling has the effect that, with the same size coil, the resulting inductance across the diagonally opposite corners is enlarged by an amount depending on the coupling factor. If these inductances are constituted by the external conductors of coaxial line sections—as will be described below—the length of coaxial line required is substantially decreased, thereby effecting a material saving.

FIGURE 2 shows an embodiment of the present invention which is based on the principle illustrated in FIGURE 1. However, the inductances L1, L2, L3, L4, of FIGURE 1 are, in the circuit of FIGURE 2, and in accordance with the instant invention, constituted, respectively, by coil-wound external conductors of four coaxial line sections K1, K2, K3, K4. Each of these external conductors is connected, at its inner end, with the center point O. (For the sake of convenience, the "inner" end of each condutor will hereinafter be considered as the end which is nearest to the center point O of the bridge, while the "outer" end will be considered as the other end of the conductor, i.e., the end nearest to a corner point of the bridge.) This center point can additionally be grounded, i.e., connected either to true ground or to the chassis of an instrument.

According to the present invention, the two coaxial line sections K1 and K2 serve to shift the load resistances A1 and A2 to the other end of the coaxial line section, where they are constituted by the resistance elements WA1 and WA2, the latter being connected directly to the point O. To accomplish this, the outer ends of the internal conductors J1 and J2 of the coaxial lines K1 and K2, i.e., the ends at which the external conductors are connected to the points I and II, respectively, are connected to the adjacent corner points III and IV, respectively. The dashed lines show the original positions of the two load resistances A1 and A2. After this shifting, the resistances which are effective in the bridge arms I, IV and II, III, are the input resistances of the coaxial line sections K1 and K2. The arrows next to the bridge arms show the direction of the instantaneous currents, at a given instant, through the load resistances A1 and A2. The arrows next to the resistance elements WA1 and WA2 show that the currents flowing through these resistance elements are of the opposite phase with respect to the point O, so that these resistance elements constitute a symmetrical load with respect to the point O. Thus, the high-frequency voltage applied across the terminals $x$—$x$ is symmetrical with respect to the center point O.

Just as the load resistances were shifted with respect to the center point by means of the coaxial line sections K1 and K2, so are the load balancing resistances B1 and B2 shifted, with respect to the point O, by the coaxial line sections K4 and K3 as indicated by resistance elements WB1 and WB2. The original position of these resistances is shown in dashed lines. The outer ends of the internal conductors J3 and J4 are connected to the bridge points I and II, respectively, while the inner ends of the internal conductors J3 and J4 are connected to one terminal of the resistance elements WB2 and WB1, respectively, the other terminals of these resistance elements being connected to point O. Assuming that the bridge is symmetrical and the load balancing resistances are all equal to R, the resistance elements WA1 and WA2, representing the load resistances, as well as the resistance elements WB1 and WB2, representing the balancing resistances, will all be equal to R.

FIGURE 2 also shows that the inductance connected between the points of a diagonal, for example the inductance $L1+L2$ iying across points I and II, can be complemented to form a frequency-independent matched $\pi$-filter element by the serial capacitances C1 incorporated in the connections to the corresponding high-frequency source and the parallel inductance L$q$1 connected at the side of the high-frequency source, so that the matching requirements for the high-frequency generator G1 remains fulfilled within a broad frequency range. In a similar manner, the series connection of the inductances L3 and L4 across the points III, IV, is complemented to form an analogous $\pi$-filter element by means of series capacitances C2 and a parallel inductance L$q$2.

If the output voltage of the high-frequency generators is symmetrical with respect to ground, the output terminals can be connected directly to the ends of the inductances L$q$1 and L$q$2. FIGURE 2, however, shows the case where the output voltage of the high-frequency generator is non-symmetrical with respect to ground, there being but one terminal of each output voltage which is grounded. In this case, each of the parallel inductances L$q$1 and L$q$2 is divided into two equal inductance components L$q$1′, L$q$1″; L$q$2′, L$q$2″, which are serially connected in pairs. The inductance components of each series-circuit are, preferably, mutually coupled to each other in order that the resulting inductance be increased. The junction of the serially connected inductance components is grounded, or is connected with point O. One of the inductance components of each pair of serially-connected components is used to convert the voltage of the high-frequency generator which is non-symmetrical with respect to ground to a voltage which is symmetrical with respect to ground. To accomplish this, the inductance component L$q$1″ may be constituted by the external conductor of a fifth coaxial line section K5. As is shown in FIGURE 2, the high-frequency generator G1 has one terminal connected to point O (which, as stated above, may be grounded), and that end of the internal conductor J5 at which the external conductor of the same coaxial line section is connected to one terminal of the other inductance component L$q$1′, is connected to the other terminal of generator G1, i.e., the terminal of generator G1 which is not connected to O (or ground). The other end of this internal conductor J5, i.e., the end of the internal conductor J5 at which the external conductor of the same coaxial line section is connected, via one of the two series capacitances C1, to point II, is connected, at point *s*, with the other terminal of the inductance component L*q*1′, i.e., with that end of component L*q*1′ which is connected, via the other series capacitatnce C1, to point I.

In an analogous manner, the coaxial line K6, constituting the inductance components L*q*2″ and having an internal conductor J6, serves to convert the ground-nonsymmetrical voltage of the high-frequency generator G2 into a ground-symmetrical voltage.

FIGURE 2 shows, in the external connecting leads between the bridge points and the high-frequency generators, arrow heads and double arrow heads to represent the instantaneous currents of the two generators. It will be seen that both representations have the same underlying circuit principle. The current arrows are, in FIGURE 2, also shown with regard to the connections between the internal conductors J5 and J6 and the generator terminals. The instantaneous current at generator G1 flows into the generator through the non-grounded terminal of generator G1, while the instantaneous current flows out of the non-grounded terminal of generator G2. Assuming the internal construction of the generators to be the same, this corresponds to a push-pull operation, i.e., the two generators feed the common load in push-pull. This type of feeding is preferred because the second harmonics of the generator currents will then balance each other.

During calibrating and balancing of the bridge it is often desired that both generator voltages be taken from the same test generator. This produces, of necessity, push-push excitation during which the generator terminals corresponding to each other insofar as instantaneous potential is concerned are grounded. If, then, the polarity of the terminal voltage of one of the generators is changed over in this manner, the polarity of its connection to the corresponding bridge diagonal must also be changed so that the circuit feeding remains as shown by the arrows in FIGURES 1 and 2. This is accomplished by means of the connection shown in FIGURE 2 in dashed lines, the inductive component L*q*1′ here being constituted by yet another coaxial line section K8 having an internal conductor J8. The dashed connection between the non-grounded terminal of generator G1 and the end of the internal conductor J8 next to the grounded end of conductor K8 takes the place of the connection between the non-grounded terminal of G1 and the end of the internal conductor J5 next to the grounded end of conductor K5, while the dashed connection between the other end of the internal conductor J8, i.e., the end next to the end of external conductor K8 which is connected to point *s*, and point *t* replaces the connection between internal conductor J5 and point *s*. The dashed arrow next to the lead connecting internal conductor J8 with the non-grounded terminal of generator G1 shows that the instantaneous current for generator G1 flowing through the connection G1–J8–*t* is in phase with the current flowing out of the non-grounded terminal of generator G2, which, it will be understood, corresponds to an in-phase feeding during the calibration of the bridge.

In order that the inductance components L*q*1′ and L*q*1″ as well as L*q*2′ and L*q*2″ be equal to each other, in pairs, it is expedient to let them be constituted by the external conductors of coaxial line sections which are wound in a coil-like manner. For this reason, the inductance component L*q*2′ is constituted by a coaxial line section K9 having an internal conductor J9. If desired, the non-grounded terminal of generator G2 can be switched over by providing dashed connections as illustrated in conjunction with generator G1, so that the polarity of the generator G2 may be reversed.

As stated above, the output voltage of the bridge appears across points *x*—*x*, this output voltage being symmetrical or balanced with respect to ground. Consequently, a symmetrical high-frequency line is suitable for transmitting this high-frequency energy from these terminals to a distant load. If, however, a ground-nonsymmetrical high-frequency line is to be used, an unbalancing circuit or output element can be connected to points *x*—*x* in order to change the symmetry, such an output element being shown, in principle, in FIGURE 3. The upper part of FIGURE 3 shows, in dashed lines, resistance elements WA10 and WA20, the same corresponding to resistance elements WA1 and WA2 in FIGURE 2. The resistance elements which have been eliminated from across points *x*—*x* are replaced by the input resistance of the circuit of FIGURE 3 across points *y*—*y*. This circuit is a modification of a conventional balancing loop whose two inductances L7 and L8 are coupled to each other with a high coupling factor. This balancing loop is completed to form a T-filter by means of the series capacitance C3 on the symmetrical side and the series capacitance C4 which is connected to the head of the internal conductor of the coaxial line section K7. Arranged at the end of the coaxial line section K7, whose external conductor constitutes the inductance L7, is the resistance member WA which represents the series-connection of the resistance elements WA10 and WA20, this element WA having the same resistance value as the series-circuit.

FIGURE 4 is the equivalent circuit of the arrangement of FIGURE 3, from which it is readily apparent that the balancing arrangement is, in effect, a frequency-independent matched T-filter element having a terminal connected to the center point of the bridge. It will thus be seen from FIGURES 2 and 3 that not only ground-nonsymmetrical output resistances can be used.

Figure 5:
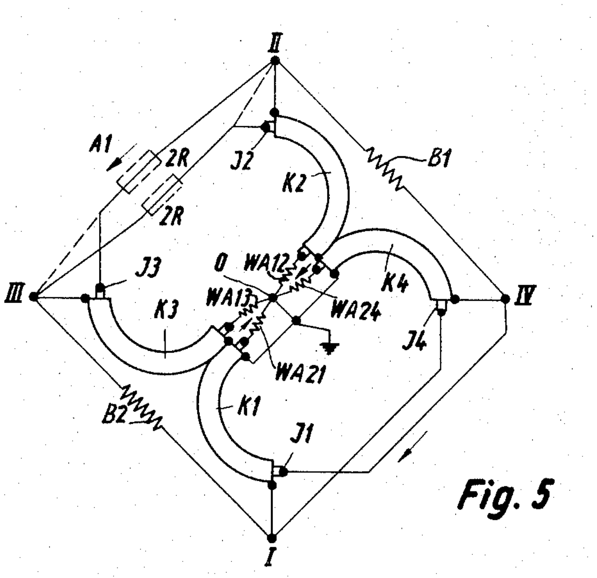
FIGURES 5, 6, 7 and 8 are further examples of bridge circuits according to the present invention.
Figure 6:
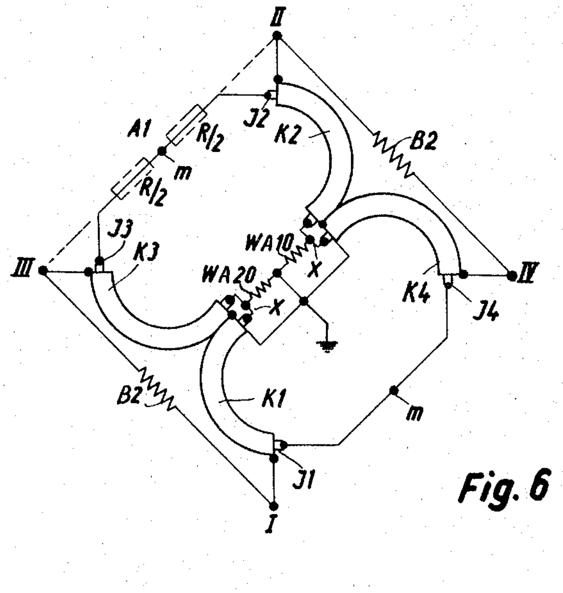

FIGURES 5 and 6 are two embodiments similar to that of FIGURE 2 in which, however, the shifting of the balancing resistances is dispensed with and all four coaxial line sections are used for the divided shifting of the load resistances A1 and A2. Here, too, the circuit is symmetrical insofar as the phase angle of the shifted load resistances is concerned, but it is now additionally possible to make the resulting load resistance equal to 2R or to $R/2$, and, moreover, to make the characteristic impedance of the coaxial line sections which shift the load resistances equal to 2R or to $R/2$. The reason that it is often desirable is to allow the impedance of the coaxial line sections to be selectable if one or the other type of coaxial line section which is needed is not readily available as a standard item.

The various parts are identified, in FIGURES 5 and 6, with the same reference characters as used in FIGURE 2. For the sake of simplicity, FIGURES 5 and 6 do not show the high-frequency generator G1 and G2 or the $\pi$-filter elements or balancing means used in conjunction with the generators, which, in practice, can be arranged as described and illustrated in conjunction with the circuit of FIGURE 2.

It will be seen from FIGURE 5 that the series-connection of the external conductors of the coaxial line sections K1 and K2 lies across the bridge points I and II while the series-connection of the external conductors of the coaxial line sections K3 and K4 lies across the bridge points III and IV. The inner ends of the external conductors of all of the coaxial line sections are connected with the center point O (or ground). The two coaxial line sections K2 and K3 together serve to shift the load resistance A1, which can be considered as being constituted by two parallely connected individual resistors each having a value 2R. This is shown in dashed lines. The coaxial line section K2 serves to displace that part which is connected directly to point III while the coaxial line section K3 serves to displace that part which is connected with point II. Accordingly, there will appear at the inner ends of the coaxial line section, that is to say, at the inner ends of the internal conductors J2 and J3, the resistance elements WA12 and WA13. These have the same resistance value as do the two individual resistors (each having a value 2R) which together constitute the load resistance A1, namely, 2R.

In the same manner, the two parts of the load resistance A2 (not illustrated) are shifted from between the points I and IV and are now replaced by the resistance elements WA21 and WA24, each having a resistance equal to 2R.

The instantaneous currents through the bridge arms are again shown by the arrows, and this shows that pairs of resistance elements have current of the same phase flowing through them. These pairs of resistance elements—elements WA12 and WA24 as well as WA13 and WA21 in FIGURE 5—can thus be combined.

The characteristic impedance of each of the coaxial line sections of FIGURE 5 is also 2R to correspond to the values of the individual load resistances and the resistance elements which have taken their place. This is yet another difference between the circuit of FIGURE 5 and that of FIGURE 2, in which latter the characteristic impedance of each coaxial line section is equal to R.

If the resistors representing the load resistance A1 between points II and III are considered absent (cf. the load resistance in the bridge arm I, IV), each internal conductor will be seen to be connected, at the end of the coaxial line at which the corresponding external conductor is connected with a corner point of the bridge, to the other corner point. In this way, the inputs of the coaxial line sections in the load arms are effective relative to each other in parallel. In contradistinction thereto, the circuit of FIGURE 6 is such that the input resistances of the coaxial line sections in the two load branches are effective relative to each other in series. For purposes of explanation, the load resistance A1 in the arm II, III, should be imagined as being sub-divided into two serially-connected resistors each having a resistance value of $R/2$. The point $m$ is then the electrical midpoint of this bridge arm. Sets of two coaxial line sections, for example in the case of arm II, III, the coaxial line sections K2 and K3 whose external conductors are connected with the two ends of the same load arm (that is to say, with the points II and III), serve to shift the corresponding load resistance in such a manner that the two internal conductors J2 and J3 are connected, at their outer ends (i.e., at the ends of the coaxial line section at which the external conductors are connected to the points II and III), with the point $m$, and hence to each other. Connected between the inner end of each of the internal conductors J2 and J3 and the center point O is a respective resistance element whose resistance value is equal to $R/2$. The characteristic impedance of each of the coaxial line sections will, in the circuit of FIGURE 6, be equal to $R/2$ as well.

As in the case of FIGURE 5, the resistance elements representing the shifted load resistances can be combined, in pairs, so that in the circuit of FIGURE 6 only the two resistance elements WA10 and WA20 remain, the same representing the resulting load resistance across the points $x$—$x$, this resulting load resistance being symmetrical or balanced with respect to ground. Inasmuch as this resulting load resistance was obtained from the series-connection of two pairs of resistance elements, each of which has the resistance value $R/2$, the resulting load resistance in FIGURE 6 likewise has a resistance equal to $R/2$. Apart from this distinction and the fact that the coaxial line sections have different characteristic impedances, the circuits of FIGURES 5 and 6 are electrically equivalent to each other. In both, the shifted load resistance is completely symmetrical for each individual load resistance, as a result of which there will be no phase error between the serially-connected resistance elements WA10 and WA20.

In the circuits of FIGURES 5 and 6, too, it is advantageous if the inductances constituted by the external conductors of two serially-connected coaxial line sections across each bridge diagonal are mutually coupled to each other with a substantial coupling factor. Such mutual coupling increases the resulting inductance in a bridge diagonal so that the individual coaxial line sections can be kept shorter than if there were no mutual coupling.

Figure 7:
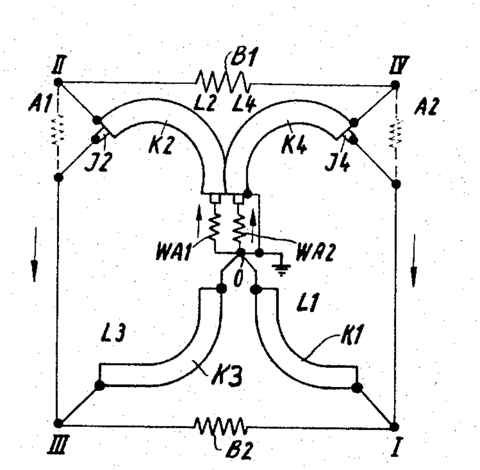

In the circuit of FIGURE 7, the inductances L2 and L4 of FIGURE 1 are constituted by the external conductors of coaxial line sections K2 and K4. As before, these coaxial line sections can be wound in a coil-like manner in order to obtain the needed inductance. As shown in FIGURE 7, the external conductors of these coaxial line sections are connected across the respective bridge point II, IV, and center point O. It is assumed that the inductances L1 and L2, and the inductances L3 and L4, within the pairs lying on the same bridge diagonal, are equal to each other. FIGURE 7 shows the inductances L1 and L3 as being constituted by the external conductors of suitably configured coaxial lines K1 and K3 whose inner conductors may remain unused.

For purposes of simplicity, the generators G1 and G2 as well as the compensating elements are not shown in FIGURE 7. However. in order to facilitate an understanding of how the generator circuitry of FIGURES 2 and 3 can be used with the circuit of FIGURE 7, the corners of the bridge are identified by the same Roman numerals.

It will be seen that in the bridge arms II, III and I, IV, the load resistances A1 and A2 which are effective there and which are shown by dashed lines, are replaced by the input resistances of the respective coaxial line sections K2 and K4. FIGURE 7 also shows, by arrows, the flow of the resulting instantaneous current (cf. FIGURE 1). It will be seen that both currents of the load arms flow out of the ends of the respective internal conductors J2 and J4 and to the corresponding points III and I. As is readily apparent, the resistance elements WA1 and WA2, which are connected at one end with the preferably grounded center point O, have currents flowing therethrough which are of the same phase and the same direction with respect to the connection to the center point O. This is shown by the arrows next to the resistance elements WA1 and WA2. Consequently, the inner ends of the internal conductors J2 and J4, i.e., the ends nearest to the center point O, can be connected directly to each other, and the parallely connected resistance elements WA1 and WA2 can be combined into a single resistance element. One substantial advantage of this, then, is that one terminal of this single combined resistance element, which takes the place of the resulting load resistances, can be grounded directly.

The circuit of FIGURE 7 also preserves the symmetry or balance of the bridge with respect to the phase angle of the resistances appearing in the load bridge arms II, III and I, IV. All that is required for this is that the electrical lengths of the coaxial line sections K2 and K3 be equal to each other.

Figure 8:
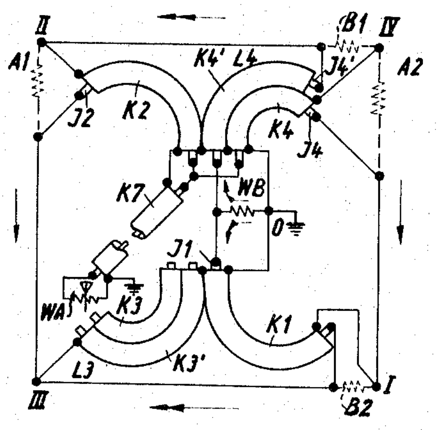

In the circuit of FIGURE 7, the balancing resistances B1 and B2 were permitted to remain in their original places, i.e., in the balancing arms II, IV and I, III. In contradistinction thereto, the circuit of FIGURE 8 shows an arrangement in which additional coaxial line sections are used for shifting the balancing resistances toward the center point O. The balancing resistance B2 can be shifted by means of an inductance which is in series with the first coaxial line section K2 or the second coaxial line section K4 in the same bridge diagonal, that is to say, by means of either the inductance L1 or the inductance L3 of FIGURE 7, if such inductance is constituted by the external conductor of a third coaxial line section whose internal conductor is connected at its outer end, i.e., at that end of the coaxial line at which the corresponding external conductor is connected with one point of the bridge arm containing the shifted balancing resistance, with the other point of the bridge arm. Thus, in the circuit shown in FIGURE 8, the inductance L1 of FIGURE 7 is constituted by the external conductor of a third coaxial line section K1, the outer end of which external conductor is shown as being connected to point I, while the outer end of the internal conductor is connected to point III. In this way, the balancing resistance B2 in the balancing arm I, III, shown in dashed lines, can be shifted toward the center point O, just as was described in conjunction with shifting the load resistances in FIGURE 7.

The balancing resistance B1 in the bridge arm II, IV, is shifted toward the center point O by means of a fourth coaxial line section K4' which is parallel to the second coaxial line section K4. The ends of the external conductor of the coaxial line section K4' are connected to the corresponding ends of the external conductor of the coaxial line section K4. (It will be understood that if the balancing resistance B2 had been shifted by means of the external conductor of a coaxial line section which consituted not the inductance L1 but the inductance L3, the fourth coaxial line section of FIGURE 8 would have had to be parallel not to coaxial line section K4 but to the coaxial line section K2 the outer end of whose external conductor is connected to point II). The internal conductor J4' of the coaxial section K4' has its outer end (i.e., the end of the coaxial line section at which the external conductor is connected to point IV) connected to point II, this being the other point of the bridge arm II, IV containing the balancing resistance B1.

No current flows through the balancing resistances during normal operation. Assuming, however, that the generator G1 (not shown in FIGURE 8 but considered to be connetced across the diagonal I, II) becomes inoperative so that the only current flowing through the bridge will be that generated by the generator G2 (likewise not shown but considered to be connected across the diagonal III, IV), the instantaneous currents will flow through the balancing arms in the directions represented by the double headed arrows. It will be seen that these intsantaneous currents will flow out of the outer ends of the internal conductors J4' and J1 and toward the bridge points II, III. With reference to the inner ends of these inner conductors, the currents through the coaxial line sections K1 and K4' will be such as to flow through the resistance element WB, taking the place of the balancing resistances B1 and B2, in the same direction and in the same phase. This resistance element, too, has one of its ends connected directly to the center point O, which, as stated above, can be grounded. This is of particular significance in circuit arrangements involving the parallelling of high-frequency generators, because the construction of the balancing resistance can be greatly simplified if one of its terminals can be grounded.

In order that the symmetry with respect to the center point O be preserved, the inductances L4 and L3 should be equal to each other throughout the entire operating frequency range of the bridge circuit. It is for this reason that the inductance L3 is likewise constituted by the external conductors of two coaxial line sections K3 and K3', the same corresponding to the external conductors of the coaxial line sections K4 and K4'. The internal conductors of the co-axial line sections K3 and K3' are not used in the circuit of FIGURE 8.

It was already mentioned above that at the inner ends of the external conductors of the coaxial line sections K2 and K4, connected to the center point O and serving to shift the load resistances, the internal conductors can be connected directly to each other because currents of the same phase and direction flow through the resistance elements WA1 and WA2 in FIGURE 7. The circuit of FIGURE 8 makes use of this fact and the resulting load resistance, which is represented by the parallel connection of the resistance elements WA1 and WA2 of FIGURE 7, is represented by the input resistance of a high-frequency line K7 which takes the place of this resulting load resistance. This high-frequency line, shown as a coaxial line, is operated in matched condition and can therefore have any desired length. Connected to the end of this line K7 is the resulting load resistance, the same being in the form of a resistance element WA. This resistance element can be constituted, for example, by the input resistance of an antenna, as represented by the symbol.

If each of the load resistances A1 and A2 appearing in the bridge arms has a resistance equal to R, the characteristic impedance of each of the coaxial line sections K2, K4 which serve to shift the load resistances is likewise selected to be equal to R. The resistance element WA, which takes the place of the resulting load resistance and which has one of its terminals connected to the center point O (or to ground), or the characteristic impedance of the high-frequency line K7 that is provided in lieu of this load resistance, is then made equal to $R/2$.

Similarly, if each of the balancing resistances B1 and B2 appearing in the balancing arms of the bridge has a resistance equal to R, the characteristic impedance of each of the coaxial line sections K1, K4', serving to shift the balancing resistance, will be made to equal R, and the resistance element WB, which represents the combined balancing resistance one of whose terminals is connected to O (or to ground), will be made equal to R.

It will be understood that the above description of the present invention is susceptible to various changes, modifications and adaptations, and the same are intended to be comprehended within the meaning and range of equivalents of the appended claims.

What is claimed is:

1. A circuit arrangement for feeding a common load from first and second high-frequency generators whose outputs are of the same frequency and are either in phase or of the opposite phase, said circuit arrangement comprising a balanced Wheatstone-type alternating current bridge; said bridge having a center point and two diagonals, the first and second generators being connected across said diagonals, respectively; two opposite arms of said bridge being load arms and the other two opposite arms being balancing arms; said load arms being connected to, respectively, first and second coaxial line sections each having an external and an internal conductor and each conductor having an inner and an outer end, the external conductor of each coaxial line section constituting an inductance, the inductances connected to the two load arms being equal to each other; the outer end of each external conductor being connected to one point of the bridge pertaining to the respective load arm and the outer end of the corresponding internal conductor being connected to a place in the respective load arm which is spaced from said one point; the inner ends of said external conductors being connected to each other in consequence of which said inductances are connected in series, the junction of said external conductors being connected to said center point of the bridge; said serially-connected external conductors lying across one of said diagonals of the bridge; and a resistance element connected across the inner ends of the external and internal conductors of each of said coaxial line sections, said resistance element representing at least a portion of the load resistance which is shifted toward said center point of the bridge.

2. A circuit arrangement as defined in claim 1, further comprising two equal, serially connected third and fourth inductances connected across the other of said bridge diagonals, the junction of said third and fourth inductances being connected to said center point of the bridge.

3. A circuit arrangement as defined in claim 2 wherein said third and fourth inductances are constituted by the external conductors of third and fourth coaxial line sections.

4. A circuit arrangement as defined in claim 3 wherein the outer end of the external conductors of said third and fourth coaxial line sections are connected to one point of the bridge pertaining to the respective balancing arm and the outer end of each corresponding internal conductor is connected to a place in the respective balancing arm which is spaced from said last-mentioned point; the circuit arrangement further comprising a resistance element connected across the inner ends of the external and internal conductors of each of said third and fourth coaxial line sections, said last-mentioned resistance element representing at least a portion of the balancing resistance which is shifted toward said center point of the bridge.

5. A circuit arrangement as defined in claim 4 wherein each of the load and balancing resistances is equal to R, wherein each of said resistance element is equal to R, and wherein the characteristic impedance of each of said coaxial line sections is equal to R.

6. A circuit arrangement as defined in claim 3 wherein the load resistance of each load arm is equal to R, and wherein said coaxial line sections are arranged in pairs, the outer ends of the two coaxial line sections of each pair being connected, respectively, to the two end points of a common load arm of the bridge, the outer ends of the internal conductors of each coaxial line section being connected to the opposite point of the respective load arm, each of said resistance elements having a resistance equal to 2R and the characteristic impedance of each of said coaxial line sections being equal to 2R.

7. A circuit arrangement as defined in claim 3 wherein the load resistance of each load arm is equal to R, and wherein said coaxial line sections are arranged in pairs, the outer ends of the two coaxial line sections of each pair being connected, respectively, to the two end points of a common load arm of the bridge, the outer ends of the internal conductors of each coaxial line section being connected to the electrical mid-point of the respective load arm, each of said resistance elements having a resistance equal to $R/2$ and the characteristic impedance of each of said coaxial line sections being equal to $R/2$.

8. A circuit arrangement as defined in claim 7 wherein said outer ends of the internal conductors of each pair of coaxial line sections are connected to each other.

9. A circuit arrangement as defined in claim 3 wherein said coaxial line sections are arranged in pairs, the outer ends of the two coaxial line sections of each pair being connected, respectively, to the two end points of a common load arm of the bridge, the outer ends of the internal conductors of each coaxial line section being connected to another point of the corresponding load arm, there being a total of four resistance elements each connected across the inner ends of the internal and external conductors of a respective coaxial line section.

10. A circuit arrangement as defined in claim 9 wherein pairs of resistance elements through which flows current of the same phase and direction with respect to said center point of the bridge are combined into a single resistor so that there is obtained a series connection of two resistors.

11. A circuit arrangement as defined in claim 1, further comprising means connected across at least said one diagonal of said bridge for complementing the serially connected inductances to form therewith a frequency-independent matched $\pi$-filter network.

12. A circuit arrangement as defined in claim 11 wherein said $\pi$-filter network comprises two series capacitances incorporated, respectively, in two leads connecting one of said high-frequency generators across said one diagonal, and a parallel inductance connected across said one generator.

13. A circuit arrangement as defined in claim 12 wherein said parallel inductance comprises two equal, serially connected inductance components, the junction of said inductance components being connected to said center point of the bridge.

14. A circuit arragement as defined in claim 13 wherein said inductance components are mutually coupled to each other.

15. A circuit arrangement as defined in claim 13 wherein said one generator has one terminal connected to said center point of the bridge, and wherein at least one of said inductance components is constituted by the external conductor of a further coaxial line section, said last-mentioned external conductor being connected at its inner end to said center point of the bridge and at its outer end to one of said capacitances in one of said leads; the internal conductor of said further coaxial line being connected at its inner end to the other terminal of said one generator and at its outer end to the other of said capacitances in the other of said leads.

16. A circuit arrangement as defined in claim 1 wherein the series connection of two of said resistance elements is constituted by an unbalancing circuit incorporating a single resistance member whose resistance is equal to the resistance of said series connection of the two resistors, said unbalancing circuit having a terminal connected to said center point of the bridge circuit.

17. A circuit arrangement as defined in claim 1 wherein said inductances are mutually coupled to each other.

18. A circuit arrangement as defined in claim 1 wherein said external conductors of said coaxial line sections are wound in the configuration of a coil.

19. A circuit arrangement as defined in claim 1 wherein said center point of the bridge is grounded.

20. A circuit arrangement for feeding a common load from first and second high-frequency generators whose outputs are of the same frequency and are either in phase or of the opposite phase, said circuit arrangement comprising a balanced Wheatstone-type alternating current bridge; said bridge having a center point and two diagonals, the first and second generators being connected across said diagonals, respectively; two opposite arms of said bridge being load arms and the other two opposite arms being balancing arms; said load arms being connected to, respectively, first and second coaxial line sections each having an external and an internal conductor and each conductor having an inner and an outer end, the external conductor of each coaxial line section constituting an inductance, the inductances connected to the two load arms being equal to each other; the outer end of each external conductor being connected to one point of the bridge pertaining to the respective load arm and the outer end of the corresponding internal conductor being connected to a place in the respective load arm which is spaced from said one point; the inner ends of said external conductors being connected to each other in consequence of which said inductances are connected in series, the junction of said external conductors being connected to said center point of the bridge; and a resistance element connected across the inner ends of the external and internal conductors of each of said coaxial line sections, said resistance element representing at least a portion of the load resistance which is shifted toward said center point of the bridge.

21. A circuit arrangement as defined in claim 20, further comprising third and fourth coaxial line sections whose external conductors constituting inductances, each being connected across said center point of the bridge and a respective one of the end points of the other of said balancing arms, in consequence of which one of said first and second inductances forms with one of said third and fourth inductances a series-circuit which lies across a respective bridge diagonal, the two inductances of each series-circuit being substantially equal to each other.

22. A circuit arrangement as defined in claim 21, further comprising means connected across said diagonals of said bridge for complementing the respective serially-conducted inductances thereacross to form with each a respective frequency-independent matched $\pi$-filter network.

23. A circuit arrangement as defined in claim 20 wherein pairs of resistance elements through which flows current of the same phase and direction with respect to said center point of the bridge are combined into a resistance which is unbalanced with respect to said center point of the bridge.

24. A circuit arrangement as defined in claim 23 wherein said unbalanced resistance includes a high-frequency coaxial line.

25. A circuit arrangement as defined in claim 20, further comprising a third coaxial line section for shifting the balancing resistance of one of said balancing arms toward said center point of the bridge, said third coaxial line section having external and internal conductors, said third external conductor constituting an inductance, said third external conductor having its outer end connected to one end point of said one balancing arm and its inner end connected to said center point of the bridge in consequence of which said third external conductor forms together with said first external conductor a series-circuit which lies across one of said diagonals of the bridge, said third inner conductor having its outer end connected to the other end point of said one balancing arm; and a resistance element connected across the inner ends of said third external and internal conductors, said last-mentioned resistance element representing the balancing resistance of said one balancing arm which is shifted toward said center point of the bridge.

26. A circuit arrangement as defined in claim 25, further comprising a fourth coaxial line section for shifting the balancing resistance of the other of said balancing arms toward the center point of the bridge, said fourth coaxial section having external and internal conductors, said fourth external conductor constituting an inductance, said second and fourth coaxial line section being parallel with each other, said fourth external conductor having its outer end connected to the same point of the bridge as that to which the outer end of said second external conductor is connected and hence being connected to one end point of the other of said balancing arms, said fourth external conductor having its inner end connected to said center point of the bridge, said fourth internal conductor having its outer end connected to the other end point of said other balancing arm; and a further resistance element connected across the inner ends of said fourth external and internal conductors, said last-mentioned resistance element representing the balancing resistance of said other balancing arm which is shifted toward the center point of the bridge.

27. A circuit arrangement as defined in claim 26 wherein said inner ends of said third and fourth internal conductors are connected to each other and said two resistance elements representing the shifted balancing resistances are combined into a single resistor.

28. A circuit arrangement as defined in claim 26, further comprising additional inductance means connected across said center point of the bridge and said other end point of said one balancing arm, said additional inductance means comprising parallelly-connected fifth and sixth external conductors of fifth and sixth coaxial line sections, said fifth and sixth external conductors being substantially equal to said second and fourth external conductors, respectively.

29. A circuit arrangement as defined in claim 28 wherein each of the load resistances is equal to R, wherein the characteristic impedance of the coaxial line sections which shift the load resistance is equal to R, and wherein the resistance elements representing said load resistances are combined into one resistance one terminal of which is connected to said center point of the bridge, said one resistance having a value equal to $R/2$.

30. A circuit arrangement as defined in claim 29 wherein said one resistance is constituted by a further coaxial line whose characteristic impedance is equal to $R/2$.

31. A circuit arrangement as defined in claim 29 wherein each of the balancing resistances is equal to R, wherein the characteristic impedance of the coaxial line sections which shift the balancing resistance is equal to R, and wherein the resistance elements representing said balancing resistances are combined into one resistance one terminal of which is connected to said center point of the bridge, said one resistance having a value equal to $R/2$.

No references cited.

HERMAN KARL SAALBACH, *Primary Examiner.*

R. D. COHN, *Assistant Examiner.*